May 7, 1935.  J. S. COFFIN, JR., ET AL  2,000,581
LUBRICATED BEARING
Filed March 9, 1933
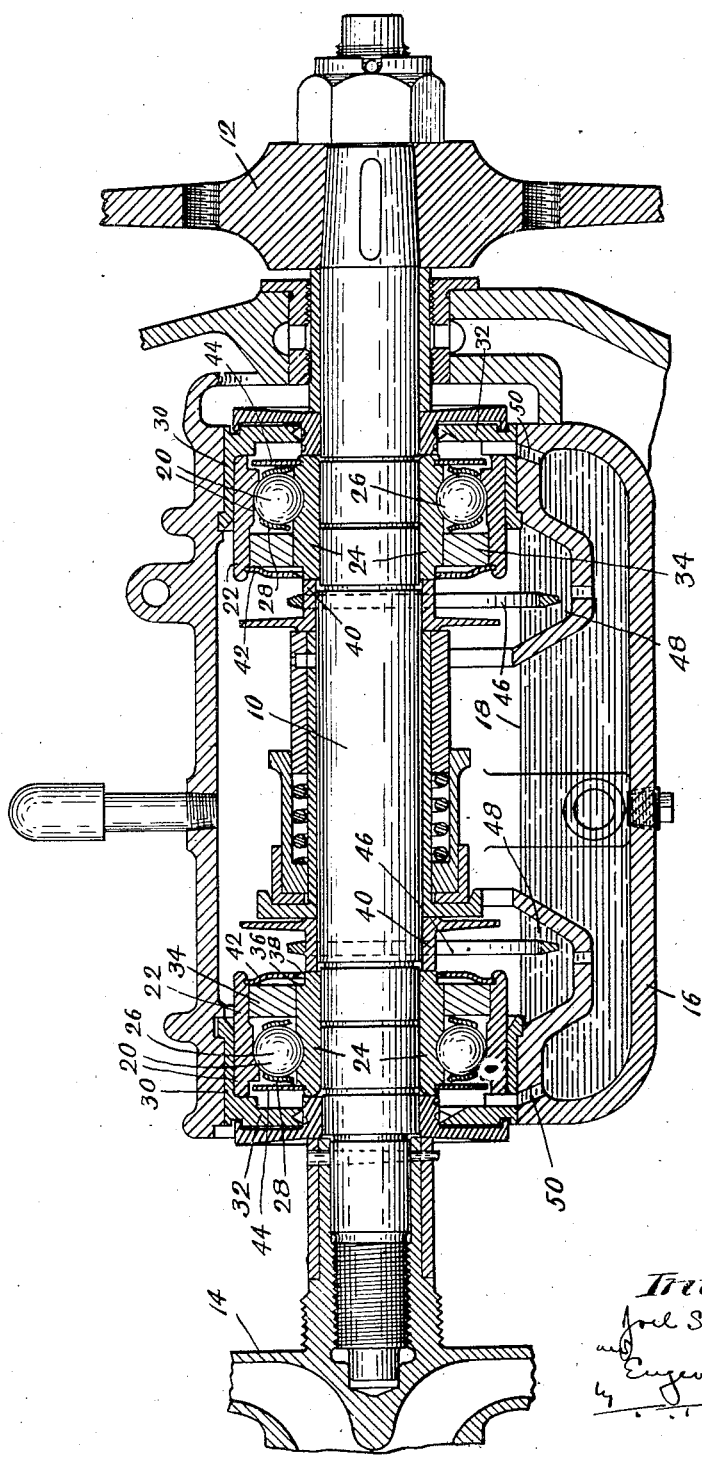

Patented May 7, 1935

2,000,581

UNITED STATES PATENT OFFICE 2,000,581

LUBRICATED BEARING

Joel S. Coffin, Jr., Englewood, and Eugene L. Schellens, Ridgewood, N. J., assignors to C-S Engineering Company, Englewood, N. J., a corporation of Delaware Application March 9, 1933, Serial No. 660,128

16 Claims. (Cl. 308—187)

This invention relates to bearings, especially anti-friction bearings, and to lubricating devices therefor.

One of the objects of the present invention is the provision of a bearing, and especially an anti-friction bearing, so arranged that the lubricating fluid is caused to traverse the bearing in a general axial direction by the action of the rotating parts thereof.

Another object of the invention is the provision of an anti-friction bearing, and particularly a ball bearing, having self-contained means that causes a flow of oil in a determined direction through the bearing.

A further object of the invention is the provision of a bearing of the type above set forth wherein an oil pad functions as an oil reservoir for the bearing and filters the oil from any solid matter therein contained and wherein centrifugal means are provided to maintain the pad constantly saturated or filled with oil in such manner that the oil in the pad is caused to flow in a determined direction through the bearing.

Another object of the invention is the provision of a bearing and especially a ball bearing having outer and inner races with an oil pad forming a closure for one end of the bearing, there being means to maintain the pad saturated with oil and the rotatable race at the other end of the bearing having a flange that expels used oil from the bearing and is instrumental in causing a circulation of oil through the bearing.

A further object is generally to improve the construction and performance of lubricated bearings.

The figure is a section taken axially through a shaft and the bearings therefor that embody the present invention.

The invention is here illustrated as applied, although not necessarily restricted, to a turbine driven pump unit having a shaft 10 with a turbine wheel 12 at one end and a pump impeller 14 at the other end. The shaft passes through a supporting housing 16 that constitutes a lubricant reservoir adapted to contain a liquid lubricant, as oil, to some suitable level 18. The shaft is supported rotatably in the housing by a pair of spaced anti-friction or ball bearings 20 constructed in accordance with the present invention. The bearings are or can be identical and but one will be explained. The bearing comprises an outer race or sleeve 22 and an inner race or sleeve 24 between and in rolling engagement with which is an annular row of balls 26 retained in suitable alignment by a retainer 28 and located adjacent the outer ends of the races. The inner race 24 is carried by and is rotatable with the shaft 10. The outer race 22 is stationary and is located within a cup 30 that is secured within the housing 16, the cup having an annular inwardly-directed flange 32 that overlies the outer end of the bearing and cooperates with other parts not necessary to describe to prevent escape of oil outwardly of the housing. An annular absorbent pad 34 of felt or the like of substantial thickness and oil retaining capacity is located within the inner end of the bearing between the two races and at the rear of the row of balls and is carried preferably by the outer race and thus is stationary and is a close fit around the rotatable sleeve 24, the closeness of the fit being sufficient to prevent oil that may contain dirt particles from passing axially between the pad and the inner race to the balls. The inner race at about in line with the rear face of the pad is provided with an annular oil-throwing shoulder 36 and a reduced rearward extension 38 that abuts against the front end of an oil-bearing spacing sleeve 40. A pad-retaining and bearing cover plate or shield 42 in the form of a disc is disposed immediately in the rear of the pad 34 and is carried by and located in an annular groove of the outer race 22. The shield is dished in the middle so that it outstands away from the rear face of the absorbent pad 34 and has a hole in the middle thereof in which the extension 38 of the inner race is located, the hole being larger than the diameter of said extension 38 so that the latter can rotate without rubbing on the disc and also so that oil on the surface of the extension can pass axially therealong under the disc without contacting therewith. A bearing cover plate or shield 44 in the form of a disc is disposed at the outer end of the bearing and is fixed to and is carried by and thus is rotatable with the inner race 24, the disc being of substantial radial dimensions and overlying a part of the outer race but spaced peripherally therefrom sufficiently to allow oil to pass between the outer race and the outer periphery of the disc and to be thrown from the periphery of the disc. An oil ring 46 is disposed on the spacing sleeve 40 and dips into an oil well 48 of the housing.

As the shaft rotates oil picked up by the oil ring 46 is deposited upon the surface of the spacing sleeve 40. The oil works its way axially along the sleeve and onto the extension 38 where it reaches the outstanding annular ledge or shoulder 36. The shoulder throws the oil outwardly against the absorbent pad 34 and into the space between the pad and the shield 42. The pad becomes saturated with oil and, since oil is being constantly supplied thereto under a slight pressure due to the action of the shoulder 36, oil is caused to flow out of the front end of the saturated pad and along the surface of the inner race and into the ball path where it is picked up by the rotating balls and thus lubricates them and both ball races. The oil works further through the bearing and comes in contact with the rotating shoulder or disc 44 which by centrifugal effect draws the oil out of the bearing and throws it into the space between the disc and the flange 32. The oil escapes from this space through a convenient passage 50 and returns to the reservoir. Thus the arrangement provides for a constant flow of oil through the bearings. Any dirt in the incoming oil is retained in the pad 34 by its straining and capillary effect so that the oil that circulates through the bearing is maintained clean. This is of considerable importance to insure long satisfactory operation of high speed anti-friction bearings. The oil capacity of the pad is sufficient to lubricate the bearing adequately for several hours, as a day's run, without the addition of oil thereto, thereby providing against damage to the bearing in the event of the oil level in the reservoir descending below the oil ring between usual periods of inspection.

While we have herein shown an oil ring to carry the oil onto a rotating part of the shaft, where it can travel to the shoulder 36, yet an oil ring is not essential for the performance of the invention and in general any means that supplies oil to the shaft in sufficient abundance will be satisfactory.

At the final stage of manufacturing the bearing, it is lubricated and the edges of the cover plates 42 and 44 are sealed to the outer and inner races respectively with paraffin or a heavy grease, thereby to prevent entrance of dirt to the bearing during handling, dirt being highly injurious to a high speed ball bearing. The cover plates thus provide means by which the complete sealing of the bearing can be effected readily.

We claim:

1. The combination of a shaft and an anti-friction bearing therefor having a filter in one end thereof, and means for forcibly introducing a lubricating fluid into and through said filter and into one end of the bearing and for forcibly expelling the lubricating fluid from the filter and from the other end of the bearing.

2. The combination of a shaft, a bearing therefor, an absorbent pad disposed in one end of the bearing, and centrifugal means to introduce oil under a slight pressure into said pad from one face thereof to saturate it and to cause excess oil to flow out of a pressure free face of said pad into said bearing.

3. The combination of a shaft, a bearing therefor, an absorbent pad disposed at one end of the bearing, centrifugal means to apply oil under a slight pressure against one face of said pad to saturate it and to cause excess oil to flow out of a pressure free face of said pad into said bearing, and centrifugal means located at the other end of said bearing to expel used oil from the bearing.

4. The combination of a shaft, a bearing therefor having outer and inner races, rolling members therebetween and engaged therewith, an absorbent pad located in one end of said bearing in the space between said races, centrifugal means to maintain said pad overflowing with oil so that oil flows therefrom into the space between said races, and centrifugal means at the other end of said bearing to expel oil therefrom.

5. The combination of a shaft, a bearing therefor having outer and inner races, rolling members therebetween and engaged therewith, an annular absorbent pad in one end of said bearing and carried by the stationary race, and means including a shoulder formed on the rotatable race to throw oil against and to saturate said pad under substantial pressure to overflowing with oil.

6. The combination of a shaft, a bearing therefor, an annular absorbent pad in one end of said bearing, means including a shoulder rotatable with said shaft to throw oil forcibly against the outer face of said pad whereby to saturate said pad under substantial pressure to overflowing with oil and to cause the oil to flow out of the pad from the inner face thereof and into the bearing, and a shoulder located at the other end of said bearing and rotatable with said shaft to expel oil from said bearing.

7. The combination of a shaft and a ball bearing therefor having an inner race rotatable with said shaft, a stationary outer race and balls between the races, an absorbent annular pad located in one end of said bearing between said races and carried by a race, and centrifugal means to introduce oil under substantial pressure against the outer face of said pad to cause the oil to pass through said pad and flow from the pressure free inner face thereof into the ball space of the bearing.

8. The combination of a shaft and a ball bearing therefor having an inner race rotatable with said shaft, a stationary outer race and balls between the races, an absorbent annular pad located in one end of said bearing between said races and carried by a race, centrifugal means to introduce oil under substantial pressure into said pad to cause it to overflow into the ball space of the bearing, and an annular outstanding flange carried by said inner race at the other end of the bearing which expels oil from the bearing.

9. The combination of a shaft and a ball bearing therefor having an inner race that is rotatable with the shaft, a stationary outer race, balls located between and bearing on said races, an annular absorbent pad located in one end of said bearing between and carried by one of said races, said inner race having a shoulder adjacent said pad that forces oil into the pad by centrifugal action, said inner race at the other end of said bearing having an outstanding shoulder which expels oil from said bearing, and means for supplying said shoulder with oil.

10. The combination of a shaft and a ball bearing therefor having an inner race that is rotatable with the shaft, a stationary outer race and balls located between and bearing on said races, an annular absorbent pad located in one end of the bearing between and carried by one of said races, a cover shield carried by said outer race and overlying and closely spaced from the end face of said pad, said inner race having a shoulder that is located in position to throw oil into the space between said shield and pad and against said pad, and means for supplying oil to said shoulder.

11. The combination of a shaft and a ball bearing therefor having an inner race that is rotatable with the shaft, a stationary outer race and balls located between and bearing on said races, an annular absorbent pad located in one end of the bearing between and carried by one of said races, a cover shield carried by said outer race and overlying and closely spaced from the end face of said pad, said inner race having a shoulder that is located in position to throw oil into the space between said shield and pad and against said pad, said inner race having an outstanding shoulder at the other end of said bearing which expels oil therefrom.

12. A ball bearing comprising outer and inner races, balls located between and bearing on said races, an annular absorbent pad located in one end of said bearing between said races, an exposed cover plate carried by the stationary race and overlying the end face of said pad, and an exposed cover plate for the other end of said bearing carried by and rotatable with the rotatable race.

13. A ball bearing comprising an inner rotatable race and an outer stationary race, balls located between and bearing on said races, and an annular absorbent pad located in one end of said bearing between said races and carried by said stationary race, said rotatable race having a shoulder adjacent said pad which throws oil onto said pad by centrifugal action.

14. A ball bearing comprising an inner rotatable race and an outer stationary race, balls located between and bearing on said races, an annular absorbent pad located in one end of said bearing between said races and carried by said stationary race, said rotatable race having a shoulder adjacent said pad which throws oil onto said pad by centrifugal action, and said rotatable race at the other end of the bearing having an outstanding shoulder that expels oil centrifugally from the bearing.

15. A ball bearing comprising an inner rotatable race, an outer stationary race, balls located between and bearing on said races, an annular absorbent pad located between said races at one end of the bearing and carried by said stationary race, a cover plate carried by said stationary race and overlying and closely spaced from the end face of said pad, said inner race having a shoulder adjacent said pad which throws oil against said pad and into the space between said pad and cover, and said inner rotatable race having fixed thereto at the other end of said bearing an outstanding cover plate that expels oil centrifugally from said bearing.

16. An anti-friction bearing comprising outer and inner races, anti-friction members located between and engaged with said races, an annular oil pad located in one end of said bearing beside said anti-friction members and carried by one of said races, and means for throwing oil centrifugally against the outer face of said pad to cause oil to flow into and through said pad into the bearing, and means located at the other end of the bearing to expel oil therefrom.

JOEL S. COFFIN, Jr.
EUGENE L. SCHELLENS.